(12) United States Patent
Sako

(10) Patent No.: US 12,399,661 B2
(45) Date of Patent: Aug. 26, 2025

(54) PRINTING APPARATUS RECEIVES PRINT JOB FROM EXTERNAL APPARATUS WITHOUT HOLDING THE PRINT JOB IN ACCORDANCE WITH JOB ATTRIBUTES, PRINT CONTROL METHOD, AND NON-TRANSITORY COMPUTER-READABLE STORAGE MEDIUM

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/366,440

(22) Filed: Aug. 7, 2023

(65) Prior Publication Data
US 2024/0053934 A1    Feb. 15, 2024

(30) Foreign Application Priority Data
Aug. 10, 2022    (JP) .................................. 2022-127523

(51) Int. Cl.
*G06F 3/12* (2006.01)
*G06K 15/00* (2006.01)

(52) U.S. Cl.
CPC .......... *G06F 3/1222* (2013.01); *G06F 3/1238* (2013.01); *G06F 3/1287* (2013.01); *G06F 3/1288* (2013.01); *G06K 15/4095* (2013.01)

(58) Field of Classification Search
None
See application file for complete search history.

(56) References Cited

U.S. PATENT DOCUMENTS

| | | | |
|---|---|---|---|
| 2003/0041269 A1* | 2/2003 | Kurishita | G06F 21/608 380/51 |
| 2008/0297837 A1* | 12/2008 | Soda | G06K 15/005 358/1.15 |
| 2010/0134818 A1* | 6/2010 | Minamizono | G06F 3/1288 358/1.15 |
| 2015/0015908 A1* | 1/2015 | Tanaka | H04N 1/32106 358/1.14 |
| 2015/0156341 A1* | 6/2015 | Sugita | G06F 3/1292 358/1.15 |
| 2016/0150104 A1* | 5/2016 | Wagatsuma | G06F 3/1205 358/1.15 |
| 2017/0039007 A1* | 2/2017 | Nathani | G06F 21/608 |
| 2019/0095152 A1 | 3/2019 | Kaneko | |
| 2019/0361635 A1* | 11/2019 | Kawanishi | G06F 3/1257 |

FOREIGN PATENT DOCUMENTS

| | | |
|---|---|---|
| EP | 1229724 A2 | 8/2002 |
| JP | 2020009062 A | 1/2020 |
| JP | 2021170258 A | 10/2021 |

* cited by examiner

*Primary Examiner* — Haris Sabah
(74) *Attorney, Agent, or Firm* — Canon U.S.A., Inc. IP Division

(57) ABSTRACT

A cloud print service specifies a job release method as a job attribute. In accordance with the job attribute, a printing apparatus controls whether a secure printing is applied or printing is to be performed without holding the print job.

10 Claims, 18 Drawing Sheets

Cloudflare's Workers AI platform

FIG.10

| JOB ATTRIBUTE | VALUE |
|---|---|
| job-release-method | system-specified |
| | forced-print |

1001 → job-release-method
1002 → system-specified
1003 → forced-print

FIG.16

| JOB ATTRIBUTE | VALUE |
|---|---|
| job-release-method | system-specified |
| | forced-print |
| | forced-store |

# PRINTING APPARATUS RECEIVES PRINT JOB FROM EXTERNAL APPARATUS WITHOUT HOLDING THE PRINT JOB IN ACCORDANCE WITH JOB ATTRIBUTES, PRINT CONTROL METHOD, AND NON-TRANSITORY COMPUTER-READABLE STORAGE MEDIUM

BACKGROUND OF THE INVENTION

Field of the Invention

The present invention relates to a printing apparatus in a cloud print service, a control method, and a storage medium therefor.

Description of the Related Art

In conventional print services, a user directly transmits a print job from a client terminal, such as a PC, to a printing apparatus to print the print job. On the other hand, in recent years, cloud print services using a cloud service on the Internet have been proposed.

A conventionally known processing sequence of cloud print will be described below with reference to FIG. 1. A printing apparatus 101 supports a cloud print function and a Web user interface (UI) function for an operation of the printing apparatus 101. A client terminal 100 supports a cloud print client function and a Web UI client for an operation of the Web UI. A cloud print service 102 represents a cloud print service on the Internet.

The user transmits a cloud print service registration request 111 to the printing apparatus 101 via the Web UI using the Web UI client of the client terminal 100. Upon receiving the cloud print service registration request 111, the printing apparatus 101 transmits a cloud print service registration request 112 to the cloud print service 102. Upon receiving the cloud print service registration request 112, the cloud print service 102 transmits a cloud print service registration request response 113 containing a registration URL 130 for cloud print registration to the printing apparatus 101. Upon receiving the cloud print service registration request response 113, the printing apparatus 101 transmits cloud print service registration URL display screen information 114 containing the registration URL 130 to the client terminal 100 via the Web UI.

Upon receiving the cloud print service registration URL display screen information 114, the client terminal 100 displays the registration URL 130 on the Web UI client. The user operates the Web UI client of the client terminal 100 to access the registration URL 130 displayed on the Web UI client. In response to the user's operation, the client terminal 100 transmits a cloud print service registration approval request 115 containing a cloud account 131 to the cloud print service 102. Upon receiving the cloud print service registration approval request 115, the cloud print service 102 transmits a cloud print service registration approval response 116 to the client terminal 100. The cloud account 131 indicates that the user has permission to use the cloud print service 102, and the user has registered a user account in the cloud print service 102 in advance.

The printing apparatus 101 transmits a cloud print service registration verification request 117 to the cloud print service 102. Upon receiving the cloud print service registration verification request 117, the cloud print service 102 transmits a cloud print service registration verification response 118 containing a cloud printer ID 132 to the printing apparatus 101. In this processing, registration of the printing apparatus 101 in the cloud print service 102 is completed, whereby the printing apparatus 101 is able to use the cloud print service 102.

After completion of the registration by the above described procedure, the printing apparatus 101 transmits a cloud print service printer information update request 140 to the cloud print service 102. The cloud print service printer information update request 140 contains a printer attribute 135 of the printing apparatus 101. Upon receiving the cloud print service printer information update request 140, the cloud print service 102 transmits a cloud print service printer information update response 141 to the printing apparatus 101.

Then, the printing apparatus 101 transmits an event request 123 to the cloud print service 102. In the event request 123, a job reception event is specified as a type of requesting event.

The client terminal 100 transmits a cloud printer information request 142 to the cloud print service 102. The cloud printer information request 142 contains the cloud account 131. Upon receiving the cloud printer information request 142, the cloud print service 102 acquires printer information about a printer available to the cloud account 131 from among printers contained in the cloud printer information request 142. Then, a cloud printer information response 143 containing the cloud printer ID 132 and the printer attribute 135 serving as the printer information is transmitted to the client terminal 100. The printer attribute 135 has been transmitted from the printing apparatus 101 to the cloud print service 102 in response to the cloud print service printer information update request 140.

The client terminal 100 transmits a print request 119 containing the cloud printer ID 132, print data 134, and the cloud account 131 to the cloud print service 102.

Upon receiving the print request 119, the cloud print service 102 transmits an event response 124 to the printing apparatus 101. The event response 124 is transmitted as a response to the event request 123, and a job reception event is specified as a type of the event.

Upon receiving the event response 124, the printing apparatus 101 transmits a print job request 120 to the cloud print service 102. The cloud print service 102 transmits a print job response 121 containing the print data 134 and the cloud account 131 to the printing apparatus 101. The printing apparatus 101 having received the print data 134 prints the print data 134. The above described operation is also discussed in Japanese Patent Application Laid-Open No. 2021-170258.

Japanese Patent Application Laid-Open No. 2020-009062 discusses hold printing in which a print job transmitted from a user without designating a printing apparatus is temporarily held in a print server, and printing is executed in response to a new print instruction from the user in a state in which a print target printing apparatus is designated.

SUMMARY OF THE INVENTION

According to an aspect of the present invention, a printing apparatus configured to receive a first print job from an external apparatus and print the first print job, the printing apparatus includes a setting unit configured to enable a secure print setting with which the first print job received from the external apparatus is to be held without being printed, and the held print job is printed in response to an instruction from a user to print the print job, and a print control unit configured to receive a second print job from a print service via a network and printing the second print job, wherein even in a case where the secure print setting is enabled by the setting unit, the print control unit prints the second print job received from the print service without holding the print job in accordance with a job attribute of the received print job.

Further features of the present invention will become apparent from the following description of embodiments with reference to the attached drawings.

BRIEF DESCRIPTION OF THE DRAWINGS

FIG. 10 is a diagram illustrating attribute information specifying a job release method that is supported by the printing apparatus in the first embodiment.

FIG. 16 is a diagram illustrating attribute information specifying a job release method that is supported by the printing apparatus according to the second embodiment.

DESCRIPTION OF THE EMBODIMENTS

In addition to normal hold printing, in a case where cloud print discussed in Japanese Patent Application Laid-Open No. 2021-170258 supports hold printing, two types of hold printing are performed by a printing apparatus. This may lead to increase in the time and effort of an operation of a user who operates the printing apparatus. Therefore, the present invention is directed to providing a method for reducing the time and effort of a user's operation in a case where cloud print supports hold printing. Each of the embodiments of the present invention described below can be implemented solely or as a combination of a plurality of the embodiments or features thereof where necessary or where the combination of elements or features from individual embodiments in a single embodiment is beneficial.

First, two types of hold printing in the present embodiments will be described.

Figure 1:
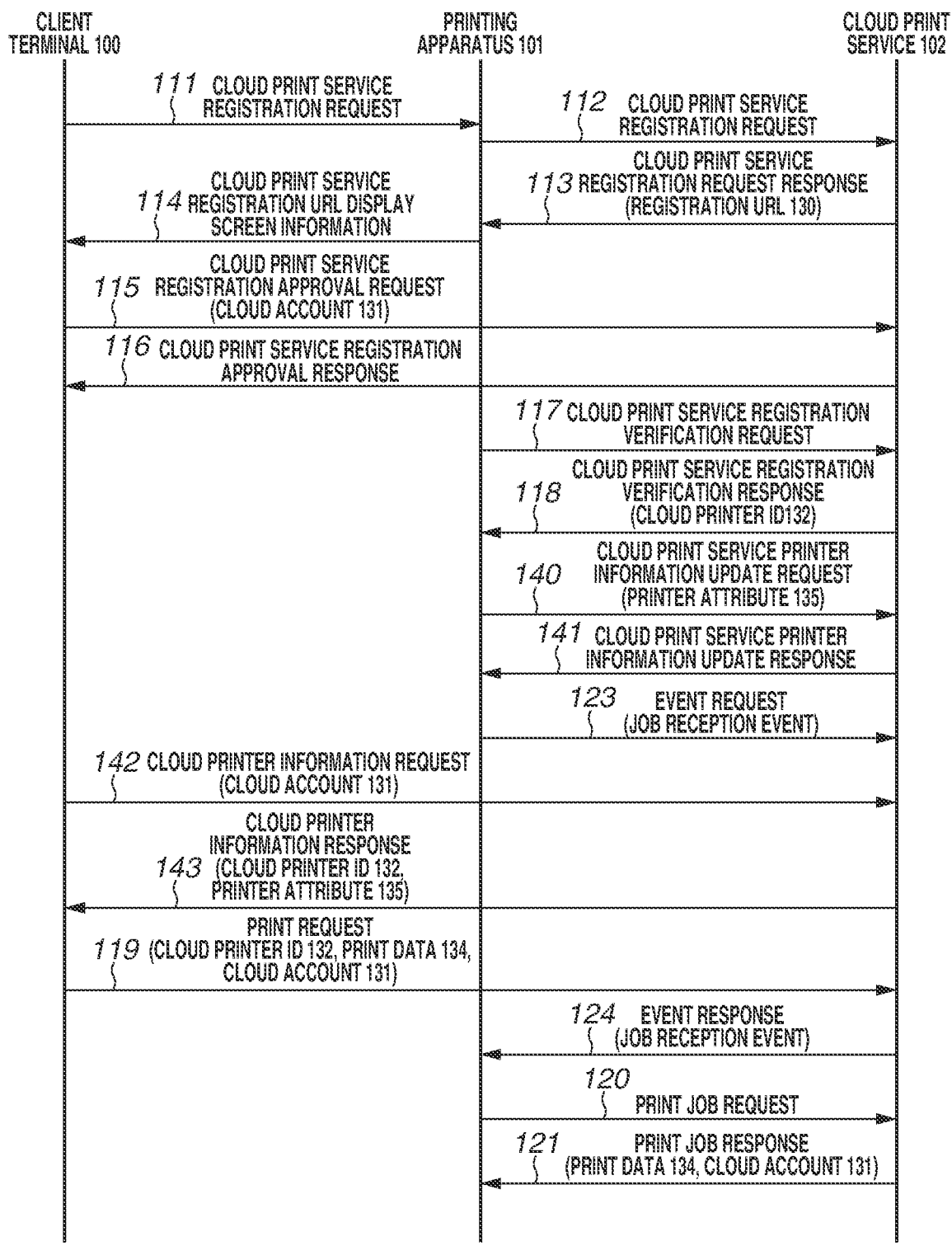
FIG. 1 is a sequence diagram illustrating cloud print processing.
Figure 2:
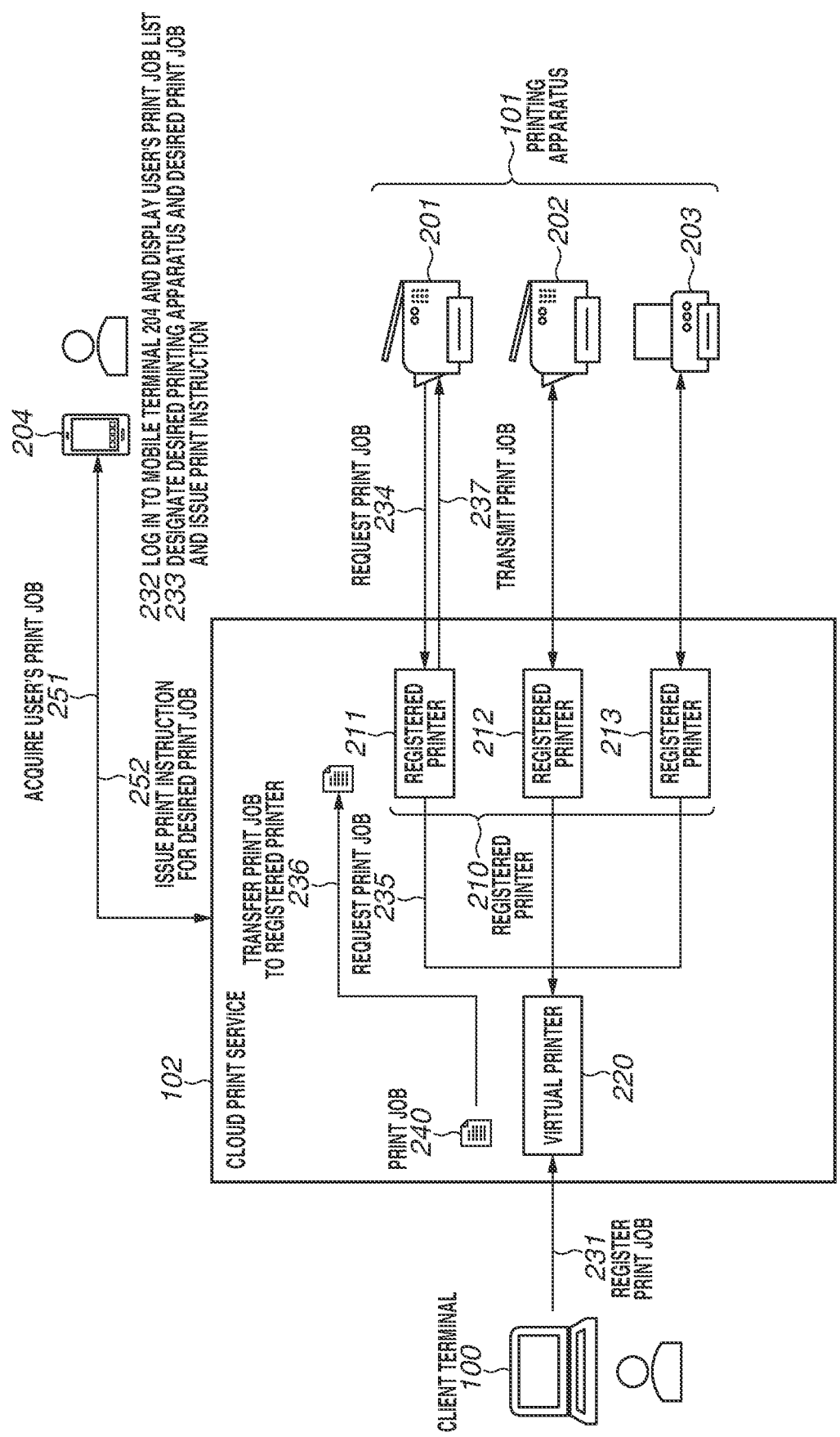
FIG. 2 is a diagram illustrating a network configuration of pull printing in cloud print.

FIG. 2 is a diagram illustrating a network configuration of pull printing in cloud print. In the cloud print service 102, there are registered printers 210 in one to-one correspondence with printing apparatuses 101. Each of the registered printers 210 reflects a status of the corresponding one of the printing apparatuses 101 and a status of a job in progress in the corresponding printing apparatus. In the present embodiment, a printing apparatus 201 corresponds to a registered printer 211, a printing apparatus 202 corresponds to a registered printer 212, and a printing apparatus 203 corresponds to a registered printer 213. A mobile terminal 204 is able to display a list of print jobs of a logged-in user. The displaying is realized by step 251 in which the mobile terminal 204 acquires a print job of a user who has logged in from the cloud print service 102.

On the mobile terminal 204, the user issues a print instruction to the cloud print service 102 by designating the printing apparatus 101 and a print job. This processing is realized by step 252 in which the mobile terminal 204 transmits the print job and information on the printing apparatus 101 to the cloud print service 102.

The cloud print service 102 has a virtual printer 220. A plurality of registered printers 210 can be associated with the virtual printer 220. In the present embodiment, the registered printers 211, 212, and 213 are associated with the virtual printer 220.

A processing procedure of pull printing using the virtual printer 220 will be described below. In step 231, the user registers a print job in the virtual printer 220 from the client terminal 100. In step 232, the user logs in to the mobile terminal 204 and displays a print job list of the user. In step 233, the user designates a desired print job and issues a print instruction. In step 234, the printing apparatus 201 requests the corresponding printer, which is registered printer 211, to transmit the print job designated in step 233.

In step 235, the registered printer 211 requests the print job from the virtual printer 220. In step 236, the virtual printer 220 transfers a print job 240 to the registered printer 211. In step 237, the registered printer 211 transmits the print job 240 to the printing apparatus 201 as a response to the print job request in step 234. The printing apparatus 201 having received the print job 240 prints the print job 240.

With the above-described procedure, the user is able to print a print job input to the virtual printer 220 by using any printing apparatus 101 associated with the virtual printer 220.

Figure 3:
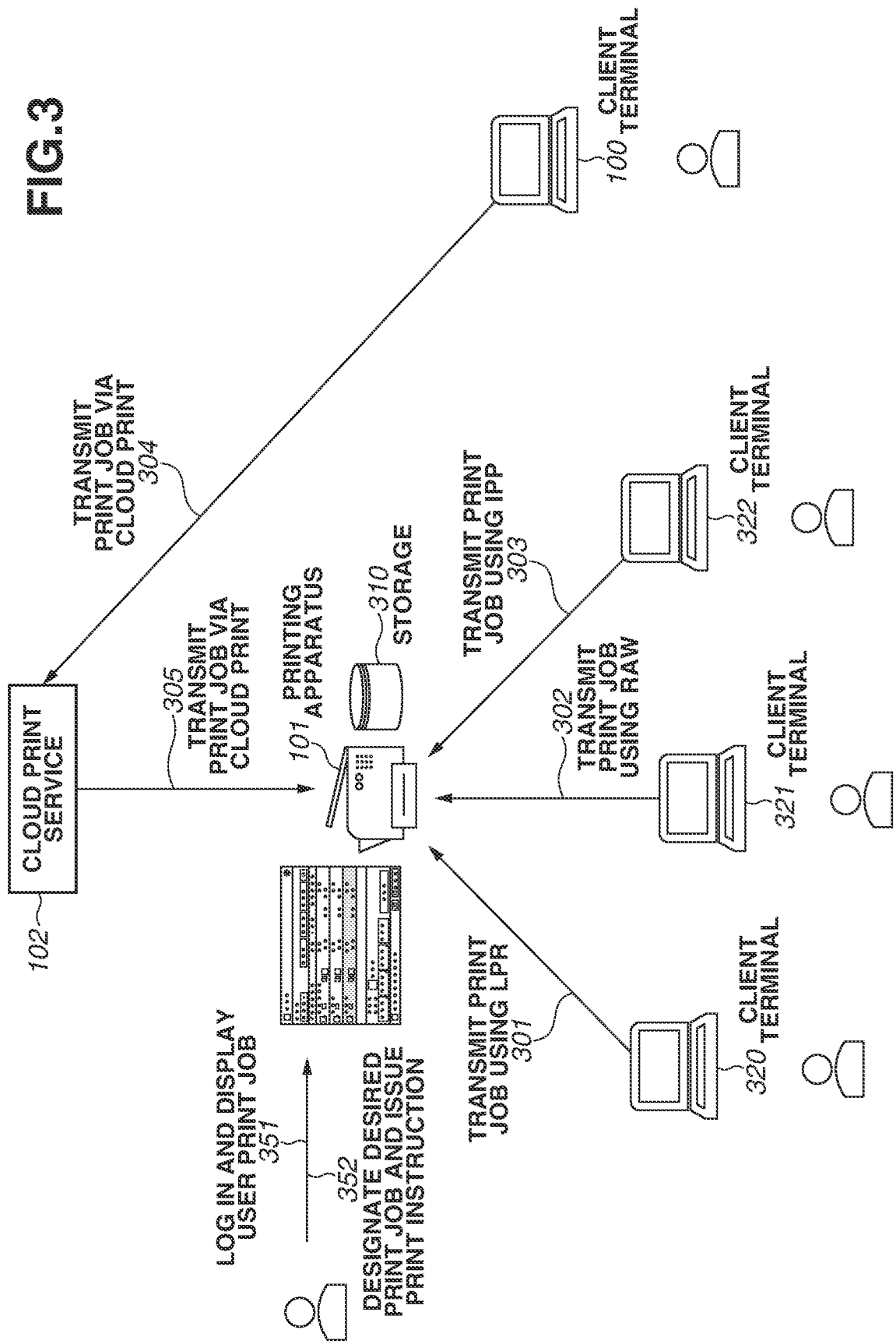
FIG. 3 is a diagram illustrating a network configuration of secure print.

Secure print, which is another type of hold printing, will be described below. FIG. 3 is a diagram illustrating a network configuration of secure print in the printing apparatus 101. In secure print, upon receiving a print job, the printing apparatus 101 stores the print job in a storage 310, for example, an HDD, without executing printing. In step 351, when the user performs printing, the user logs in to the printing apparatus 101 by using an operation panel. Then, in step 352, the user refers to a print job list of the user, designates a desired print job, and issues a print instruction to perform printing.

A method to be used by the printing apparatus 101 in the above described processing to receive the print job can be any method. FIG. 3 illustrates cases in which a client terminal 320 transmits a print job to the printing apparatus 101 by using the Line Printer Remote (LPR) protocol in step 301, a client terminal 321 transmits a print job to the printing apparatus 101 by using the RAW protocol in step 302, a client terminal 322 transmits a print job to the printing apparatus 101 by using the Internet Printing Protocol (IPP) in step 303, and the client terminal 100 transmits a print job to the printing apparatus 101 via cloud print in steps 304 and 305. A print instruction for the secure print is issued twice, that is, at a timing of step 304 when the user instructs to print data to be printed and at a timing of step 352 when the user instructs to print the held print job.

In a case where the pull printing in the cloud print described with reference to FIG. 2 and the secure print described with reference to FIG. 3 are both enabled, the user performs a login operation twice to perform printing, which deteriorates operability. Specifically, in order to perform the pull printing in the cloud print, the user logs in to the mobile terminal 204 and displays the print job list of the user in step 232. Then, in step 233, the user designates a desired job and issues a print instruction. In response to the print instruction, the print job is stored in the storage 310 of the printing apparatus 101. The user logs in to the printing apparatus 101 by using the operation panel, refers to the print job list of the user, designates a desired print job, and performs printing.

Hereinafter, in the present invention, the mode for addressing the above described issue will be described with reference to the drawings. The following embodiments are not intended to limit the present invention according to the appended claims, and not all combinations of features described in the embodiments are necessarily essential to the solving means of the present invention.

Figure 4:
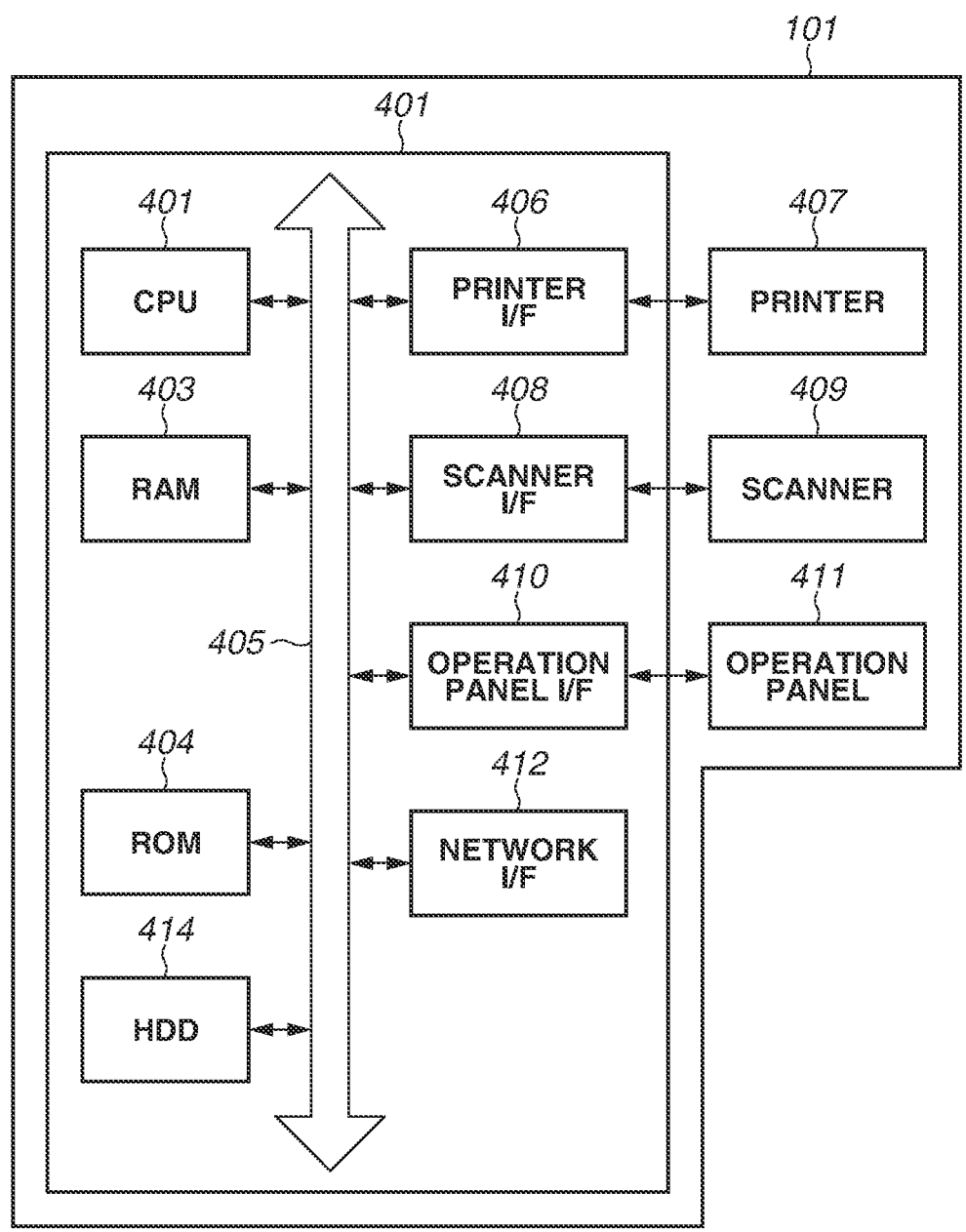
FIG. 4 is a diagram illustrating a hardware configuration of a printing apparatus according to present embodiments.

First, FIG. 4 is a block diagram illustrating a hardware configuration of the printing apparatus 101 according to the present invention. A control unit 401 including a central processing unit (CPU) 402 controls entire operation of the printing apparatus 101. The CPU 402 reads a control program stored in a read-only memory (ROM) 404 and performs various kinds of control, such as communication control. A random access memory (RAM) 403 is used as, for example, a main memory and a temporary storage area of a work area of the CPU 402. A hard disc drive (HDD) 414 stores data, various programs, and various information tables, for example.

The printer OF 406 serves as an interface to output an image signal to a printer 407 (printer engine). A scanner OF 408 serves as an interface to input a read image signal from a scanner 409 (scanner engine). The CPU 402 processes an image signal input from the scanner OF 408, and outputs the processed image signal to the printer OF 406 as a recording image signal.

The operation panel I/F 410 connects an operation panel 411 with the control unit 401. The operation panel 411 includes, for example, a liquid crystal display (LCD) unit having a touch panel function and a keyboard.

The network OF 412 transmits information to an external terminal, such as the client terminal 100 and the cloud print service 102, and receives various types of information from the external terminal.

The blocks in the control unit 401 are connected with each other via a system bus 405.

Figure 5:
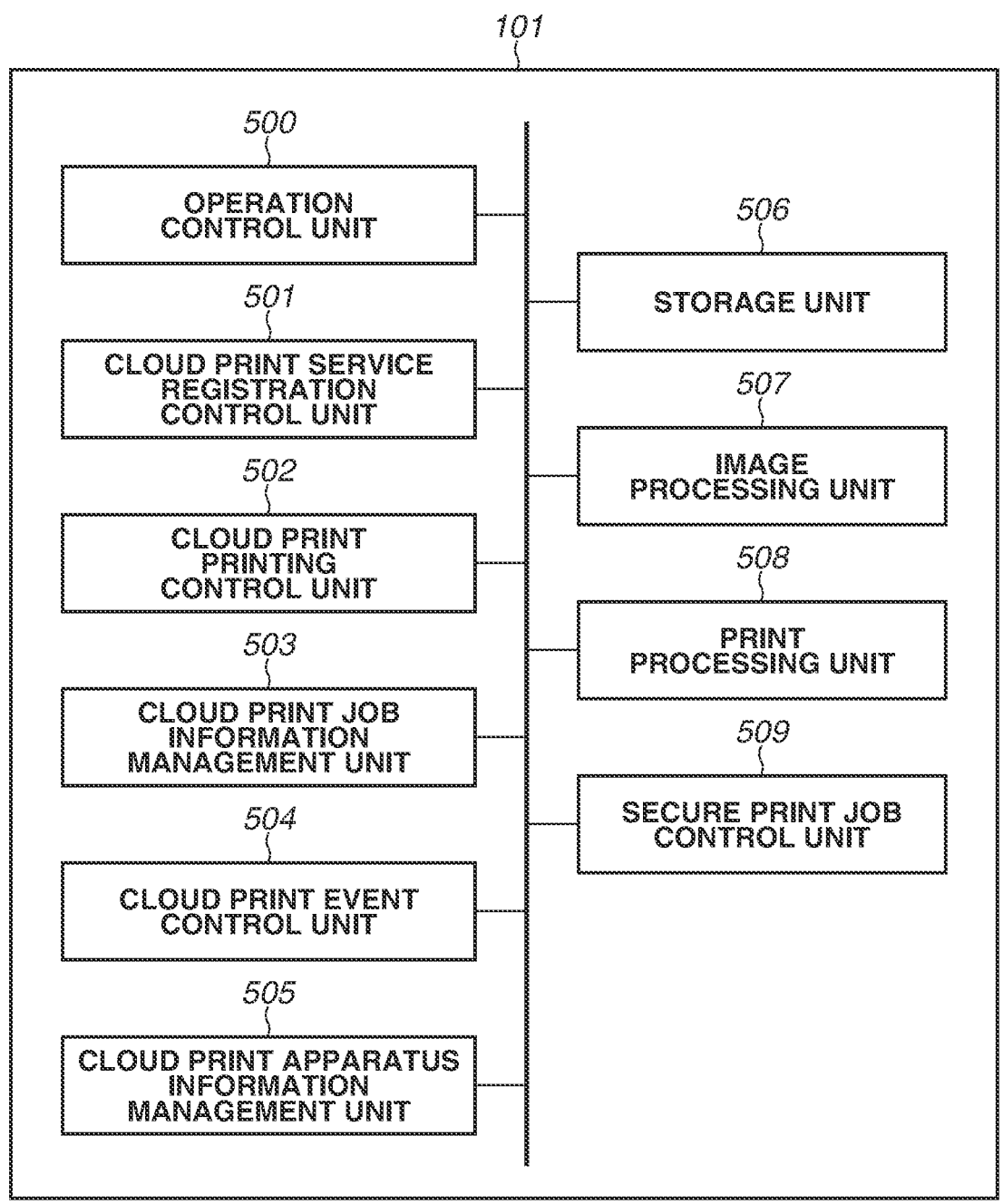
FIG. 5 is a diagram illustrating a software configuration of the printing apparatus according to the present embodiments.

FIG. 5 is a diagram illustrating a software configuration of the printing apparatus 101. Each functional unit in FIG. 5 is realized by the CPU 402, which is included in the printing apparatus 101, executing a control program.

An operation control unit 500 controls the operation panel 411. The operation control unit 500 displays an operation menu on the operation panel 411, waits for an instruction input from the user, notifies other functional units of a received instruction content, and displays a result of the instruction on the operation panel 411.

The cloud print service registration control unit 501 analyzes the cloud print service registration request 111 received from the client terminal 100, and transmits the cloud print service registration request 112 to the cloud print service 102. This processing controls a cloud print service registration process.

The cloud print printing control unit 502 transfers the print data 134 received from the cloud print service 102 to an image processing unit 507. The image processing unit 507 performs processing for rendering a print job into image data for printing.

A print processing unit 508 performs processing for printing the image data obtained by rendering performed by the image processing unit 507.

A cloud print job information management unit 503 manages job information on the printing apparatus 101, and notifies the cloud print service 102 of the job information.

A cloud print event control unit 504 controls event transmission and event reception processing between the printing apparatus 101 and the cloud print service 102.

A cloud print apparatus information management unit 505 manages apparatus information on the printing apparatus 101 and notifies the cloud print service 102 of the apparatus information.

A storage unit 506 stores, in response to an instruction from other functional units, designated data in the ROM 404 or the HDD 414, or reads out stored data. An example of data managed by the storage unit 506 is print job information.

A secure print job control unit 509 controls a secure print job.

Figure 6:
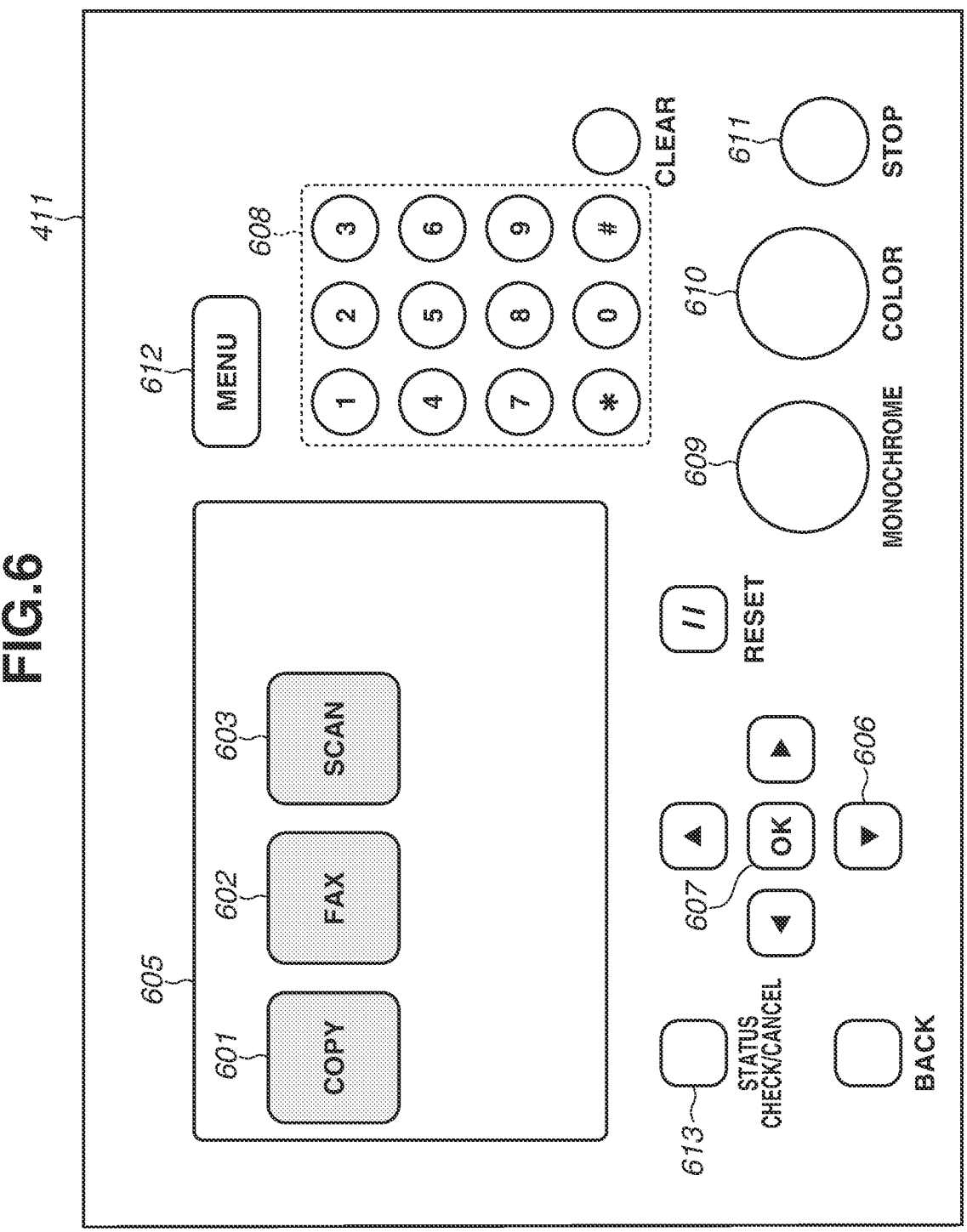
FIG. 6 is a diagram illustrating an operation panel of the printing apparatus according to the present embodiments

FIG. 6 is a diagram illustrating the operation panel 411 of the printing apparatus 101. A display panel 605 is an LCD, for example. A button 601 is pressed when copying using the printing apparatus 101 is performed, and pressing the button 601 displays a copy operation screen on the display panel 605. A button 602 is pressed when faxing using the printing apparatus 101 is performed, and pressing the button 602 displays a fax operation screen on the display panel 605. A button 603 is pressed when scanning using the printing apparatus 101 is performed, and pressing the button 603 displays a scan operation screen on the display panel 605. The display panel 605 also displays a dialog to communicate with the user. In the present embodiment, the display panel 605 further displays a user login screen and a print job list display screen.

A numeric keypad 608 is used to input, for example, numerals. An OK key 607 is used when a display content on the display panel 605 is determined. A direction key 606 is used to select a menu displayed on the display panel 605. A button 609 is used to perform monochrome copy, and a button 610 is used to perform color copy. A button 611 is used to stop processing. A button 612 is used to display a menu screen on which a setting of the printing apparatus 101 is set. A button 613 is used to check the status of the printing apparatus 101, for example, a list of print jobs received by the printing apparatus 101.

Figure 7:
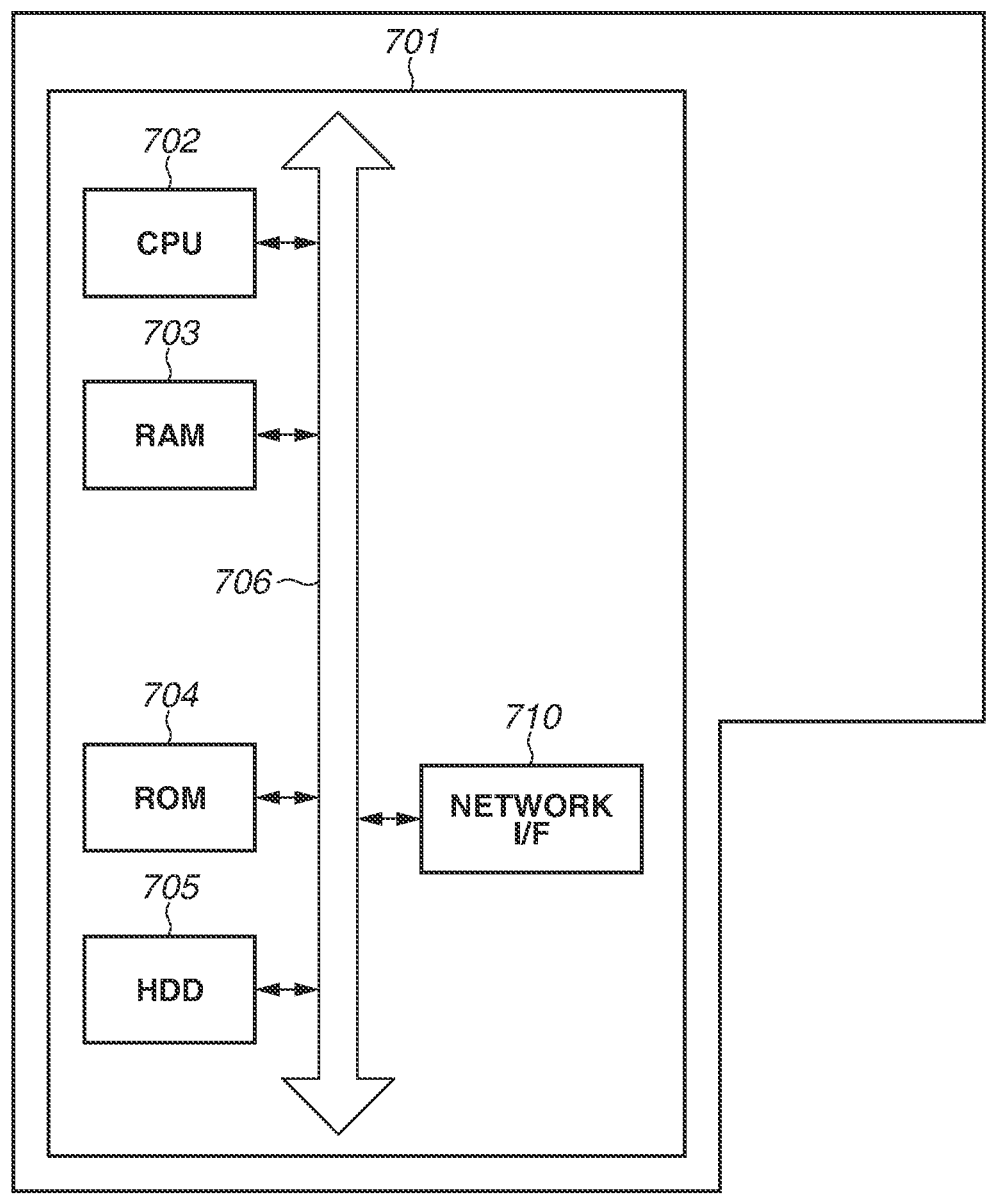
FIG. 7 is a diagram illustrating a hardware configuration of a cloud print server according to the present embodiments.

FIG. 7 is a block diagram illustrating a hardware configuration of a cloud server on which the cloud print service 102 according to the present invention is executed. A control unit 701 including a CPU 702 controls entire operation of the cloud print service 102. The CPU 702 reads out a control program stored in a ROM 704 and performs various kinds of control, such as communication control. A RAM 703 is a temporary storage area serving as, for example, a main memory or a work area of the CPU 702. An HDD 705 stores data, various programs, and various information tables, for example. The network OF 710 transmits information to an external terminal, such as the client terminal 100 and the printing apparatus 101, and receives various kinds of information from the external terminal.

The blocks in the control unit 701 are connected with each other via a system bus 706.

Figure 8:
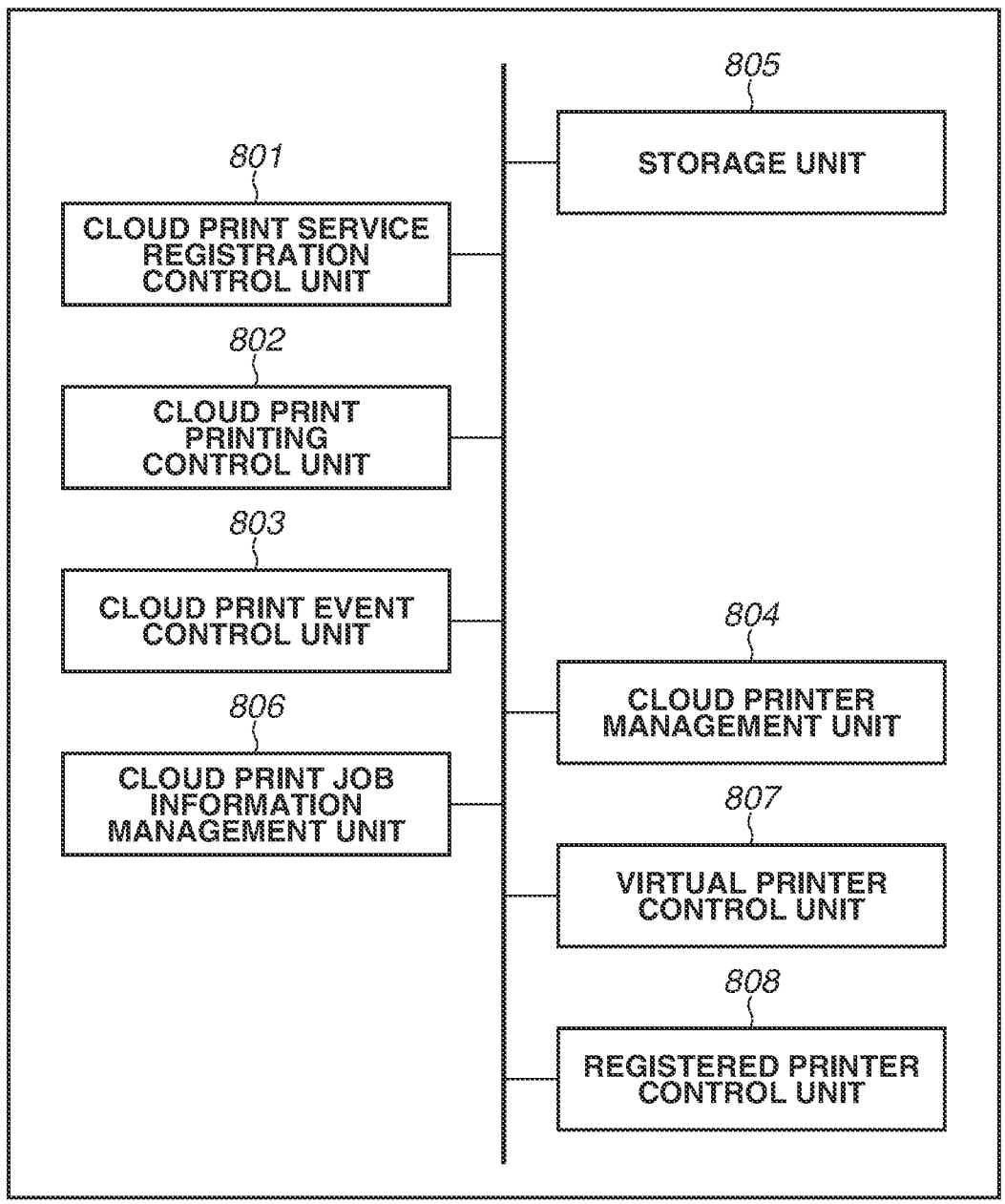
FIG. 8 is a diagram illustrating a software configuration diagram of the cloud print server according to the present embodiments.

FIG. 8 is a diagram illustrating a software configuration of a cloud server on which the cloud print service 102 is executed. Each functional unit illustrated in FIG. 8 is implemented by the CPU 702 included in the cloud server executing a control program.

A cloud print service registration control unit 801 controls processing for receiving the cloud print service registration request 112 from the printing apparatus 101 and registering the printing apparatus 101 in the cloud print service 102. A cloud print printing control unit 802 receives the print request 119 from the client terminal 100, and controls processing for transmitting the print data 134 contained in the print request 119 to the printing apparatus 101. A cloud print event control unit 803 receives the event request 123 from the printing apparatus 101, and controls processing for transmitting the event response 124 in accordance with whether an event has occurred.

A cloud print job information management unit 806 manages information on a print job and a status of the print job.

A cloud printer management unit 804 manages a plurality of printing apparatuses 101 registered in the cloud print service 102. More specifically, the cloud printer management unit 804 stores and manages, for each printing apparatus 101, printing apparatus capability information and information on a print queue for which a print job is spooled.

In response to an instruction from other functional units, a storage unit 805 stores designated data in the ROM 404 or the HDD 414, or reads out the stored data. Examples of data managed by the storage unit 805 include the print data 134, event information, and capability information on the printing apparatus 101 registered in the cloud print service 102.

A virtual printer control unit 807 manages information on the virtual printer 220 registered in the cloud print service 102. The virtual printer 220 is a conceptual printer object existing on the cloud print service 102. The virtual printer 220 does not directly correspond to the printing apparatus 101 which is a real printer. The information on the virtual printer 220 includes, for example, capability information on the virtual printer 220, a print queue, and information on the registered printer 210 associated with the virtual printer 220.

A registered printer control unit 808 manages information on the registered printer 210 registered in the cloud print service 102. The registered printer 210 is a conceptual printer object existing on the cloud print service 102. The registered printer 210 is generated when the printing apparatus 101 is registered in the cloud print service 102, and has a one-to-one correspondence with the printing apparatus 101 registered in the cloud print service 102. The information on the registered printer 210 includes, for example, capability information on the registered printer 210 and information on a print queue.

In the following description, the printing apparatus 101 and the cloud print service 102 communicate with each other using IPP.

Hereinafter, a first embodiment and a second embodiment will be described based on the above-described configuration.

Figure 9:
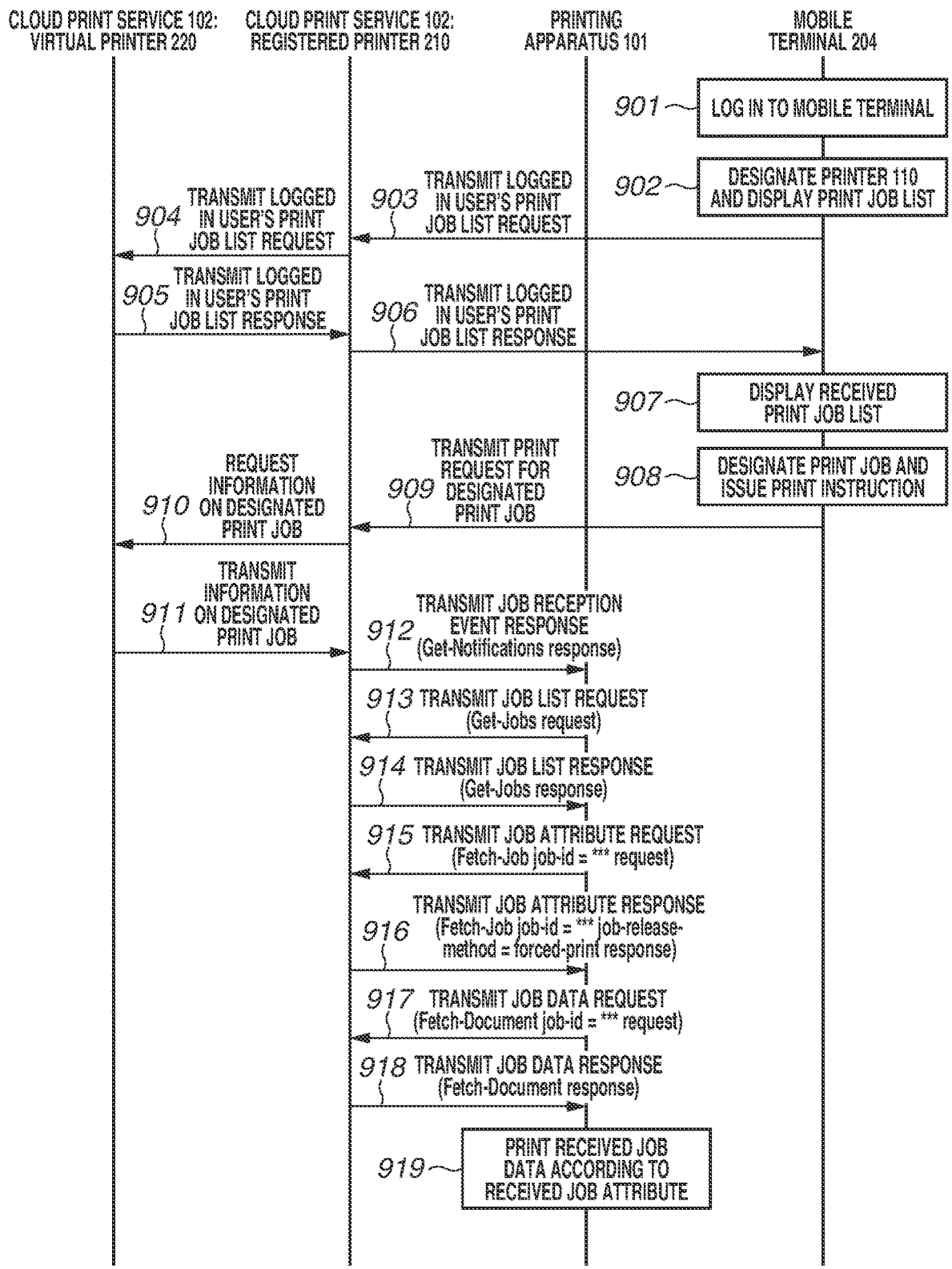
FIG. 9 is a sequence diagram illustrating processing that is executed by the printing apparatus according to a first embodiment when pull printing in cloud print is performed.

FIG. 9 is a sequence diagram illustrating processing that is executed by the printing apparatus 101 according to the first embodiment when pull printing in the cloud print is performed.

In step 901, the user logs in to the mobile terminal 204. In step 902 the user designates a desired printing apparatus 101 and performs an operation for displaying a print job list of the user.

In step 903, the mobile terminal 204 requests the registered printer 210 on the cloud print service 102 to send the print job list of the user who has logged in in step 901.

In step 904, the registered printer 210 on the cloud print service 102 requests the print job list of the user designated in step 903 from the virtual printer 220.

In step 905, the virtual printer 220 on the cloud print service 102 responds to the registered printer 210 with the print job list of the user designated in step 904.

In step 906, the registered printer 210 on the cloud print service 102 responds to the mobile terminal 204 with the print job list of the user designated in step 903.

In step 907, the mobile terminal 204 displays the received print job list.

In step 908, the user designates a desired job in the displayed print job list and performs an operation for performing printing.

In step 909, the mobile terminal 204 transmits a print request for the designated print job to the registered printer 210 on the cloud print service 102.

In step 910, the registered printer 210 on the cloud print service 102 requests the virtual printer 220 to transmit information about the print job designated in step 909.

In step 911, the virtual printer 220 on the cloud print service 102 responds to the registered printer 210 with print job information designated in step 910.

In step 912, the registered printer 210 on the cloud print service 102 responds to the printing apparatus 101 with a job reception event. Specifically, the registered printer 210 transmits a response for "Get-Notifications", which is an IPP request of event acquisition. In the response, "job-fetchable" indicating the presence of a received job is specified as the event type.

In step 913, the printing apparatus 101 transmits a print job list request to the registered printer 210 on the cloud print service 102. Specifically, the printing apparatus 101 transmits a request of "Get-Jobs", which is an IPP request of print job list acquisition.

In step 914, the registered printer 210 on the cloud print service 102 transmits a job list response to the printing apparatus 101. Specifically, the cloud print service 102 transmits a response for "Get-Jobs", which is an IPP request of event acquisition.

In step 915, the printing apparatus 101 transmits a job attribute request to the registered printer 210 on the cloud print service 102. Specifically, the printing apparatus 101 transmits a request of "Fetch-Job", which is an IPP request of job attribute acquisition. In this processing, "job-id" acquired in step 914 is used to specify "job-id".

In step 916, the registered printer 210 on the cloud print service 102 transmits a job attribute response to the printing apparatus 101. Specifically, the registered printer 210 transmits a response for "Fetch-Job", which is an IPP request of job attribute acquisition. In this processing, "job-release-method" specifying a job release method is set to the job attribute.

In step 917, the printing apparatus 101 transmits a job-data request to the registered printer 210 on the cloud print service 102. Specifically, the printing apparatus 101 transmits a request of "Fetch-Document", which is an IPP request of job data acquisition. In this processing, "job-id" acquired in step 914 is used to specify "job-id".

In step 918, the registered printer 210 on the cloud print service 102 transmits a job data response to the printing apparatus 101. Specifically, the registered printer 210 transmits a response for "Fetch-Document", which is an IPP request of job data acquisition.

In step 919, the printing apparatus 101 outputs the received job in accordance with the received job attribute.

FIG. 10 is a diagram illustrating attribute information with which a job release method that is supported by the printing apparatus according to the first embodiment is specified.

The attribute information is notified as a print attribute from the cloud print service 102 to the printing apparatus 101 in step 916 of FIG. 9. Thus, in a case of a print job transmitted from an external apparatus different from the cloud print service 102, the print job does not contain the job attribute.

The job attribute is able to be specified by the cloud print service 102.

As shown in an item 1001, "job-release-method" is defined as the job attribute.

The job attribute "job-release-method" supports a value "system-specified" and a value "forced-print" as shown in items 1002 and 1003.

In a case where "system-specified" in the item 1002 is specified, the printing apparatus 101 performs processing in accordance with a release method set in the printing apparatus 101.

In a case where "forced-print" in the item 1003 is specified, the printing apparatus 101 does not hold the print job after receiving the print job, regardless of the release method set in the printing apparatus, and executes printing without a print instruction from the user.

Figure 11:
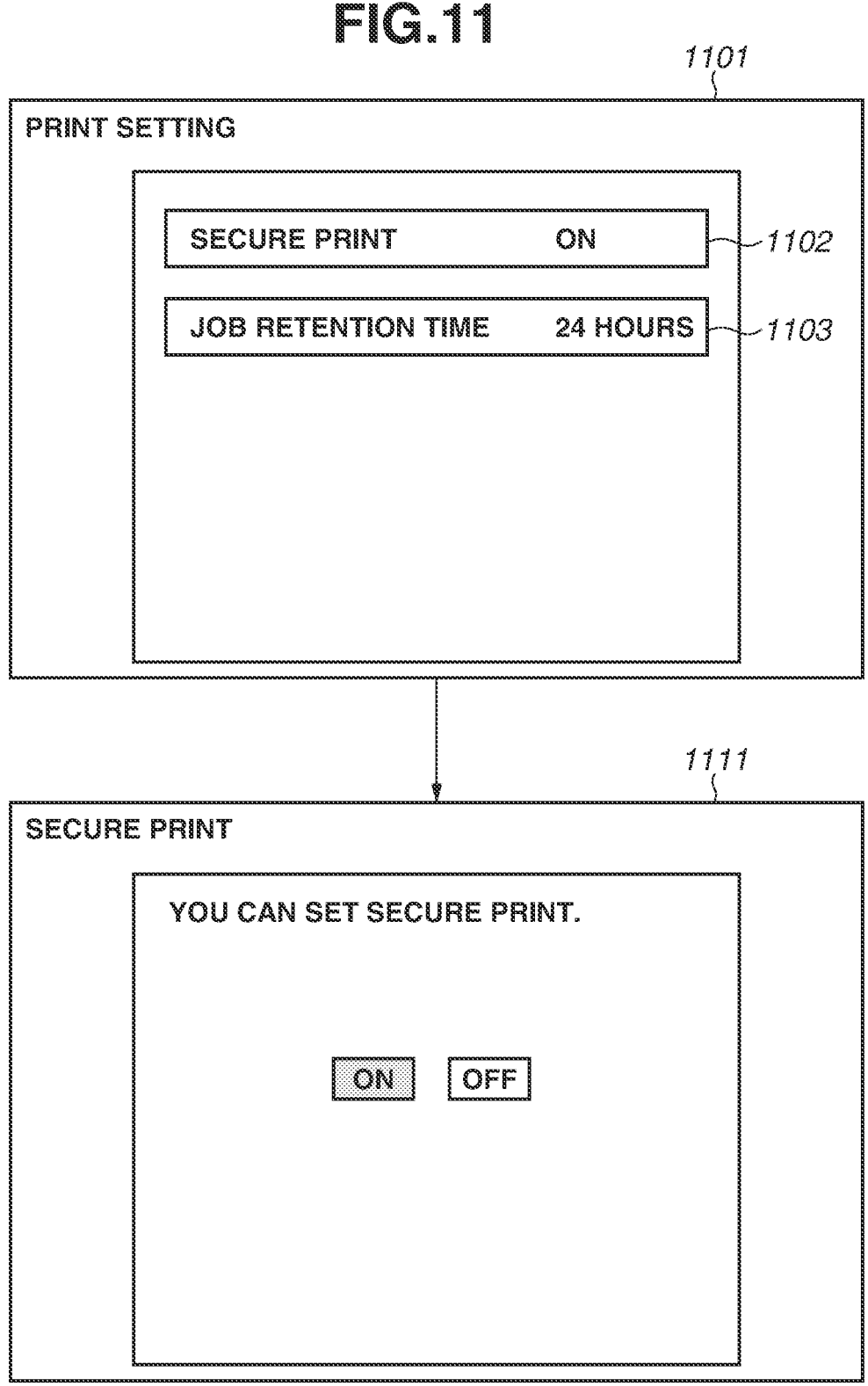
FIG. 11 is a diagram illustrating a screen on which a secure print setting is set in the printing apparatus according to the first embodiment.

FIG. 11 is a diagram illustrating a screen on which a secure print setting is performed in the printing apparatus 101 according to the first embodiment.

The screen is displayed on the display panel 605 of the printing apparatus 101. A print setting screen 1101 is a top screen of a print setting of the printing apparatus 101. A field 1102 displays a setting of the secure print. A field 1103 displays a retention time of a job stored in the printing apparatus 101.

In response to the field 1102 being touched, the screen transitions to a screen 1111 on which the secure print setting is changed. On the screen 1111, the secure print setting is able to be switched between ON and OFF.

In a case where the secure print setting is set to ON, the printing apparatus 101 stores all received print jobs in the storage 310. Printing is not performed at the timing of print job reception, and printing is performed when a print instruction for the print job is newly received from the user. Such a printing method is referred to as hold print.

Figure 12:
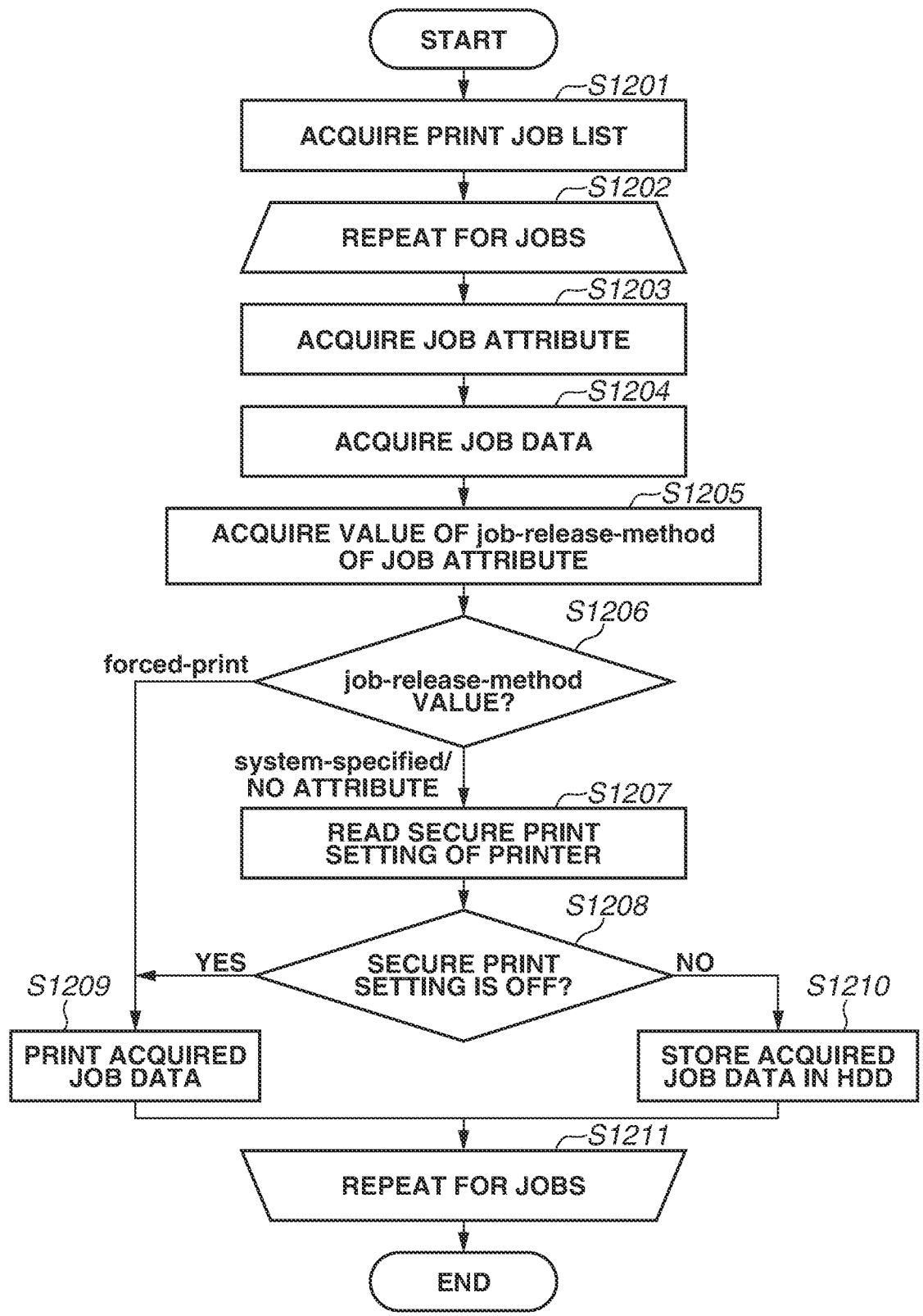
FIG. 12 is a flowchart illustrating processing that is performed by the printing apparatus according to the first embodiment in response to receipt of a cloud print job reception event.

FIG. 12 is a flowchart illustrating processing that is performed by the printing apparatus 101 according to the first embodiment receiving a cloud print job reception event.

In step S1201, the cloud print printing control unit 502 of the printing apparatus 101 acquires a print job list by sending an inquiry to the cloud print service 102. After acquisition of the print job list, processing from step S1202 to step S1211 is repeated for the number of jobs.

In step S1203, the cloud print printing control unit 502 of the printing apparatus 101 acquires a job attribute of a designated job by sending an inquiry to the cloud print service 102.

In step S1204, the cloud print printing control unit 502 of the printing apparatus 101 acquires job data of the designated job by sending an inquiry to the cloud print service 102.

In step S1205, the cloud print job information management unit 503 of the printing apparatus 101 acquires a value of "job-release-method" from the print attribute acquired in step S1203.

In step S1206, the cloud print printing control unit 502 of the printing apparatus 101 changes the subsequent processing according to the value of "job-release-method". In a case where the value of "job-release-method" is "forced-print" (forced-print in step 1206), the processing proceeds to step S1209. In step S1209, the cloud print printing control unit 502 of the printing apparatus 101 prints the acquired job data in accordance with the acquired job attribute. In a case where the value of "job-release-method" is "system-specified" or in a case where the job attribute does not exist (system-specified or NO ATTRIBUTE in step 1206), the processing proceeds to step S1207. In S1207, the storage unit 506 of the printing apparatus 101 reads out the secure print setting stored in HDD 414.

In step S1208, the cloud print printing control unit 502 of the printing apparatus 101 changes the subsequent processing according to a value of the secure print setting. In a case where the value of the secure print setting is OFF (YES in step S1207), the processing proceeds to step S1209. In step S1209, the cloud print printing control unit 502 of the printing apparatus 101 prints the acquired job data in accordance with the acquired job attribute. In a case where the value of the secure print setting is ON (NO in step S1207), the processing is proceeds to step S1210. In step S1210, the storage unit 506 of the printing apparatus 101 stores the acquired job data in the HDD 414.

Figure 13:
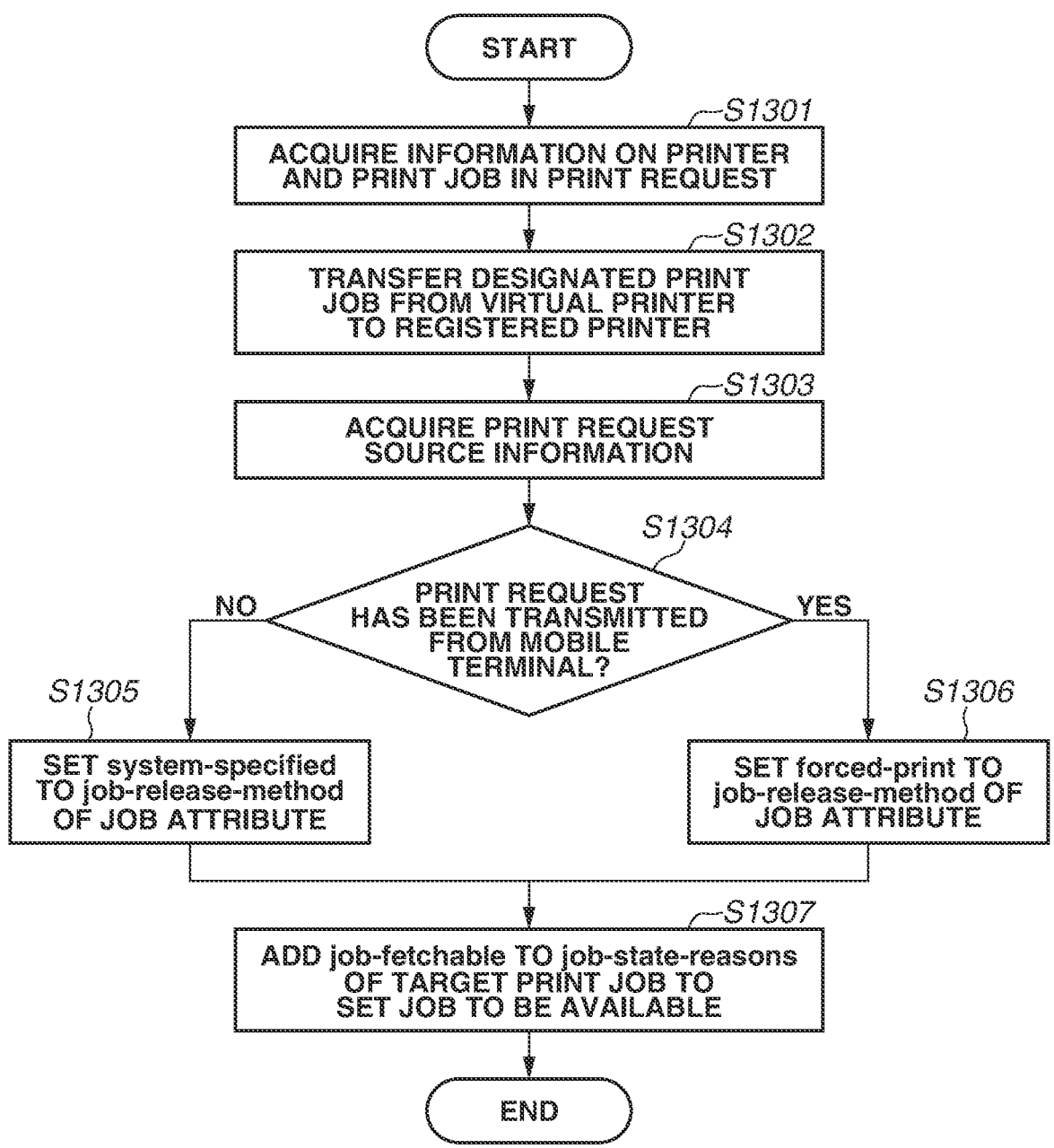
FIG. 13 is a flowchart illustrating processing that is performed by the cloud print server according to the first embodiment in response to receipt of a print request of a job.

FIG. 13 is a flowchart illustrating processing that is performed by the cloud print server according to the first embodiment in response to receipt of a print request of a job.

In step S1301, the cloud print printing control unit 802 of the cloud print server acquires information about a printing apparatus and information about a print job (job-id) which are contained in the print request.

In step S1302, the cloud print printing control unit 802 of the cloud print server transfers the designated print job from the virtual printer 220 to the registered printer 210.

In step S1303, the cloud print printing control unit 802 of the cloud print server acquires transmission source information on the print request.

In step S1304, the cloud print printing control unit 802 of the cloud print server changes the subsequent processing according to the transmission source information on the print request.

In a case where the transmission source is a mobile terminal (YES in step S1304), the processing proceeds to step S1306. In step S1306, the cloud print job information management unit 806 of the cloud print server adds "jobrelease-method" to the job attribute of the target print job, and sets "forced-print" as the value.

In a case where the transmission source is not a mobile device (NO in step S1304), the processing proceeds to step S1305. In step S1305, the cloud print job information management unit 806 of the cloud print server adds "job-release-method" to the job attribute of the target print job and sets "system-specified" as the value.

In step S1307, the cloud print job information management unit 806 of the cloud print server sets "job-fetchable" as the value of the job attribute "job-state-reasons" of the target print job, whereby the print job is able to be acquired by the printing apparatus 101.

Next, a second embodiment will be described. In the first embodiment, the user performs a login operation once in the pull printing processing performed from the mobile terminal 204.

In the second embodiment, hold print is forcibly performed in a case where a print job is directly input to a registered printer, in a configuration realizing pull printing in cloud print. The redundant description of those similar to the first embodiment is omitted.

Figure 14:
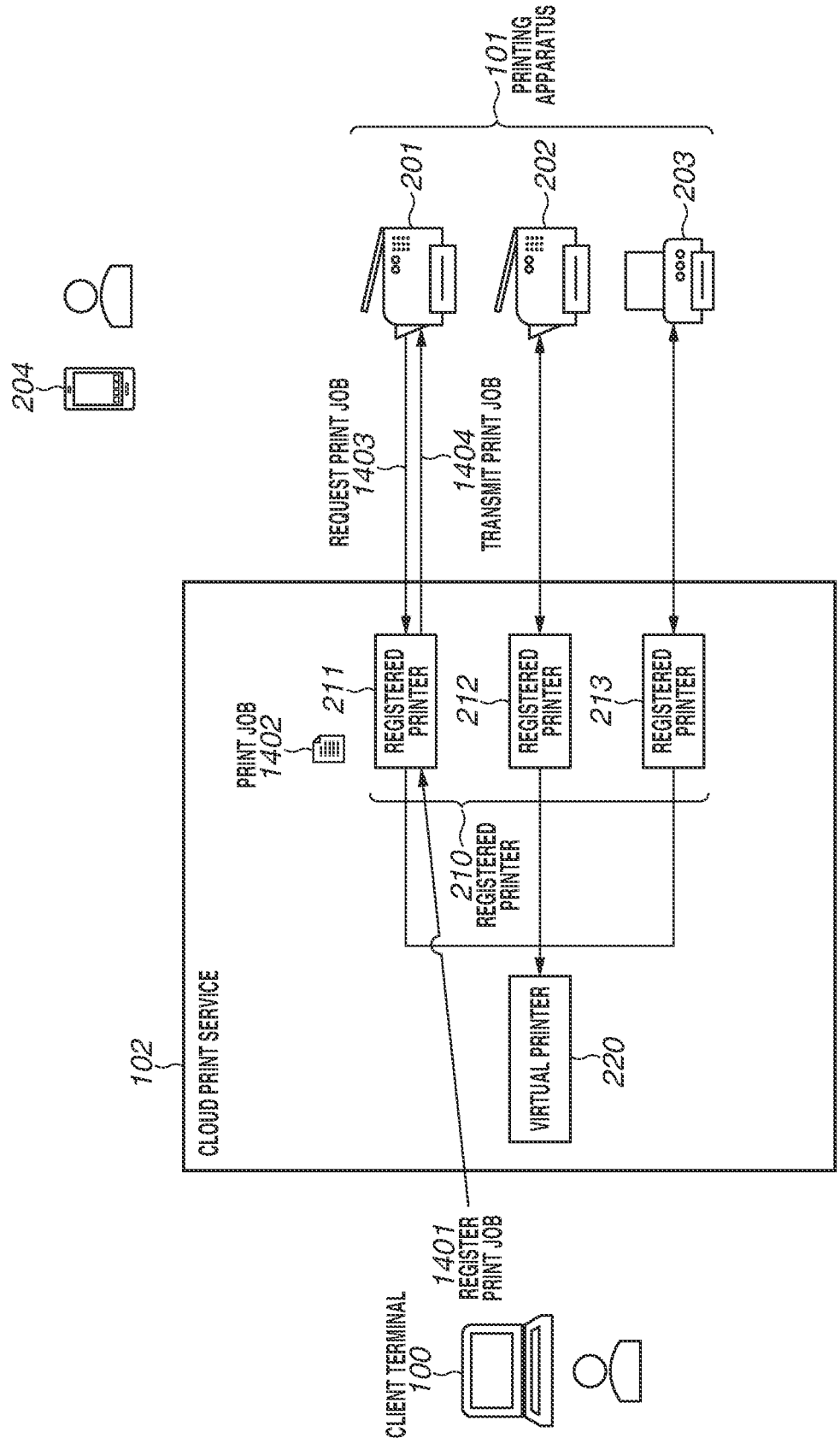
FIG. 14 is a diagram illustrating a network configuration of pull printing in cloud print according to a second embodiment.

FIG. 14 is a network diagram illustrating a configuration of pull printing in cloud print according to the second embodiment. Since the configuration illustrated in FIG. 14 is substantially the same as the configuration of the pull printing illustrated in FIG. 2, the difference will be described, and the redundant description will be omitted.

In FIG. 2, the processing procedure of a case in which a print job is input from the client terminal 100 to the virtual printer 220 is illustrated. In FIG. 14, a processing procedure of a case in which a print job is input from the client terminal 100 to the registered printer 211 is illustrated, which is the difference from the processing procedure illustrated FIG. 2.

A processing procedure for directly registering a print job in a registered printer in a pull printing configuration using the virtual printer 220 will be described below.

In step 1401, the user registers a print job in the registered printer 211 from the client terminal 100. In step 1403, the printing apparatus 201 requests a print job 1402 registered in step 1401 from the registered printer 211 corresponding to the printing apparatus 201. In step 1404, the registered printer 211 transmits the print job 1402 to the printing apparatus 201 as a response to the request for the print job in step 1403. The printing apparatus 201 having received the print job 1402 prints the print job 1402.

With the above-described configuration, the user is able to perform printing using the printing apparatus 101 by directly designating the printing apparatus 101 to perform printing even in the case of the configuration of pull printing.

Figure 15:
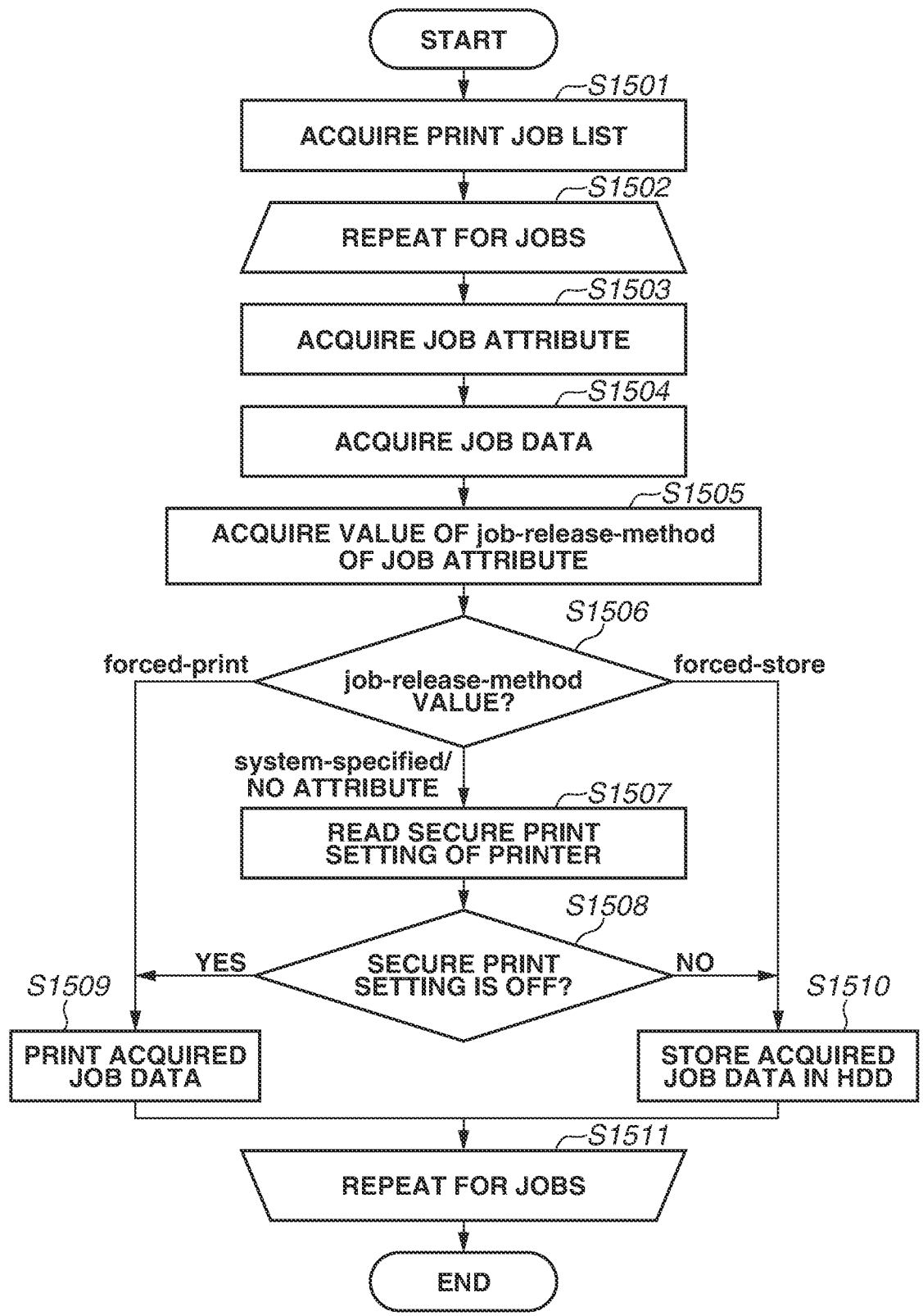
FIG. 15 is a flowchart illustrating processing that is performed by the printing apparatus according to the second embodiment in response to receipt of a cloud print job reception event.

FIG. 15 is a flowchart illustrating processing that is performed by the printing apparatus according to the second embodiment in response to receipt of a cloud print job reception event.

In step S1501, the cloud print printing control unit 502 of the printing apparatus 101 acquires a print job list by sending an inquiry to the cloud print service 102. After acquisition of the print job list, the processing from step S1502 to step S1511 is repeated for the number of jobs.

In step S1503, the cloud print printing control unit 502 of the printing apparatus 101 acquires a job attribute of a job designated by sending an inquiry to the cloud print service 102.

In step S1504, the cloud print printing control unit 502 of the printing apparatus 101 acquires job data of the job designated by sending an inquiry to the cloud print service 102.

In step S1505, the cloud print job information management unit 503 of the printing apparatus 101 acquires a value of "job-release-method" from the job attribute acquired in step S1503.

In step S1506, the cloud print printing control unit 502 of the printing apparatus 101 changes the subsequent processing according to the value of "job-release-method". In a case where "forced-print" is set as the value of "job-release-method" (forced-print in step S1506), the processing proceeds to step S1509. In step S1509, the cloud print printing control unit 502 of the printing apparatus 101 prints the acquired job data in accordance with the acquired job attribute. In a case where "system-specified" is set as the value of "job-release-method" or in a case where the job attribute does not exist (system-specified or NO ATTRIBUTE in step S1506), the processing proceeds to step S1507. In step S1507, the storage unit 506 of the printing apparatus 101 reads out the secure print setting stored in the HDD 414. In a case where "forced-store" is set as the value of "job-release-method" (forced-store in step S1506), the processing proceeds to step S1510. In step S1510, the storage unit 506 of the printing apparatus 101 stores the acquired job data in HDD 414.

In step S1508, the cloud print printing control unit 502 of the printing apparatus 101 changes the subsequent processing according to a value of the secure print setting. In a case where the value of the secure print setting is OFF (YES in step S1508), the processing proceeds to step S1509. In step S1509, the cloud print printing control unit 502 of the printing apparatus 101 prints the acquired job data in accordance with the acquired job attribute. In a case where the value of the secure print setting is ON (NO in step S1508), the processing proceeds to step S1510. In step S1510, the storage unit 506 of the printing apparatus 101 stores the acquired job data in the HDD 414.

FIG. 16 is a diagram illustrating attribute information specifying a job release method that is supported by the printing apparatus 101 according to the second embodiment. The method illustrated in FIG. 16 is substantially the same as the job release method, which is supported by the printing apparatus 101, described with reference to FIG. 10. The difference will be described, and the redundant description will be omitted.

As the value of the job attribute "job-release-method" in the item 1001, "forced-store" in an item 1601 is able to be specified. In a case where "forced-store" in the item 1601 is specified, the printing apparatus 101 does not print the acquired job data regardless of the release method set in the printing apparatus 101, and stores the job data in the storage area.

Figure 17:
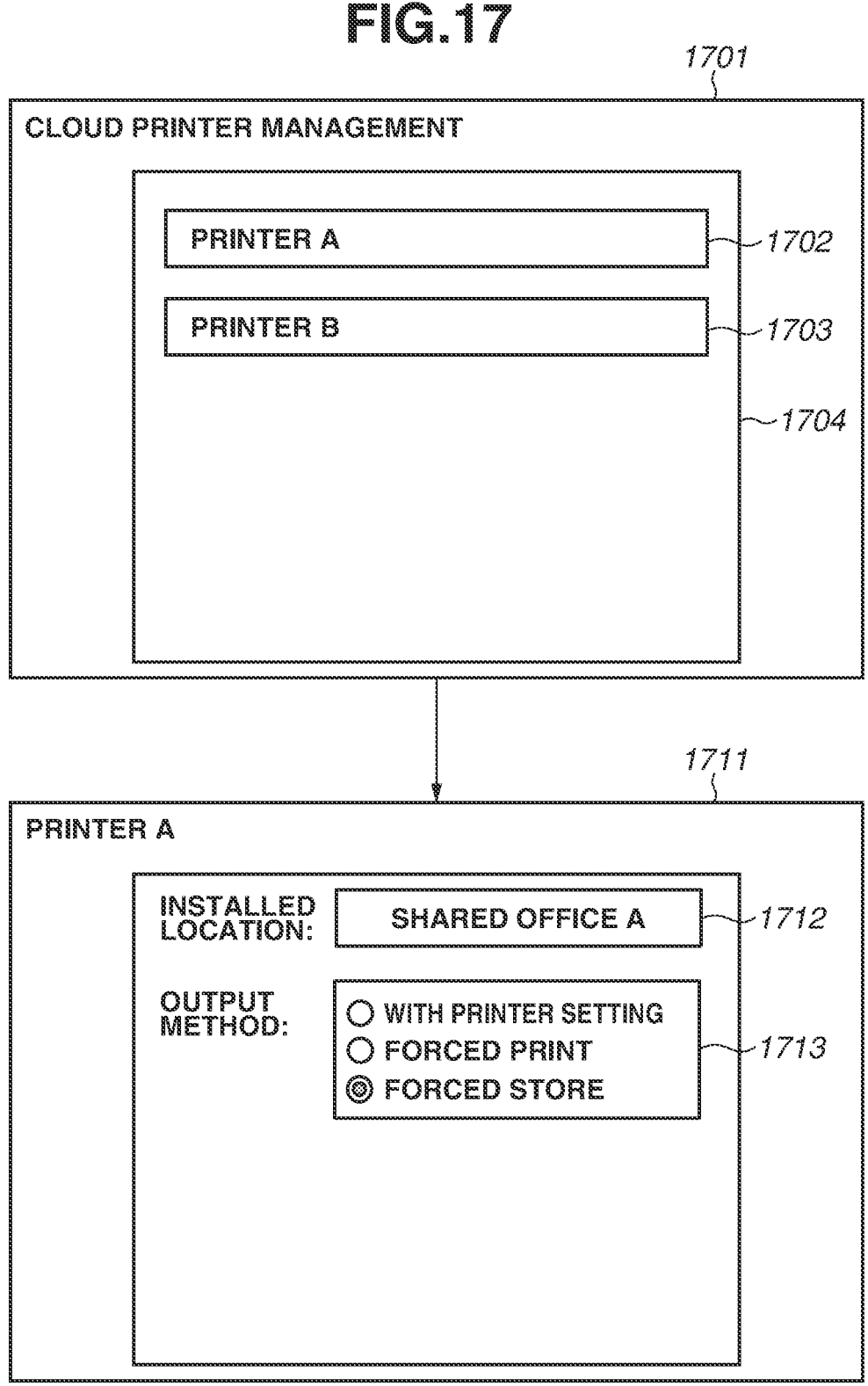
FIG. 17 is a diagram illustrating a printing apparatus management screen of the cloud print service according to the second embodiment.

FIG. 17 is a diagram illustrating a printing apparatus management screen in the cloud print service 102 according to the second embodiment. In the cloud print service 102, registered cloud printers can be managed in an integrated manner, and a setting for controlling a cloud print operation can be set for each printing apparatus.

A screen 1701 is a top screen for cloud printer management. A list of registered printers is displayed in a field 1704. In the present embodiment, a printer A in a field 1702 and a printer B in a field 1703 are registered. A selection of a displayed printer causes a transition to a screen 1711 on which a setting for the selected printer is performed.

In the present embodiment, a description is given of a case in which the screen 1711 is displayed in response to the printer A being selected. On the screen 1711 for a printer setting, an installation location of the printer A is able to be set in a field 1712. In the present embodiment, the printer A is installed in a shared office A. On the screen 1711 for the printer setting, a print job output method is able to be set in a field 1713. As the output method of the printer A, the following three settings can be set.

The first among the three settings is a setting "with printer setting". With this setting, the output method is controlled in accordance with the printer setting. No special control is performed in the cloud print service 102.

The second among the three settings is a setting "forced print". With this setting, printing is forcibly performed in the printing apparatus 101 regardless of the printer setting. In the cloud print service 102, this control is realized by setting "forced-print" as the value of "job-release-method" which is a job attribute of a print job.

The third among the three settings is a setting "forced store". With this setting, storing of job data is forcibly performed in the printing apparatus 101 regardless of the printer setting. In the cloud print service 102, this control is realized by setting "forced-store" as the value of "job-release-method" which is a job attribute of a print job.

In the present embodiment, since the setting "forced store" is selected, all jobs are stored in the printing apparatus 101. In the present embodiment, the printing apparatus 101 is installed in the shared office A, and the printed product may be seen by an unspecified number of people. In such a case, the setting "forced store" is useful from the viewpoint of security.

Figure 18:
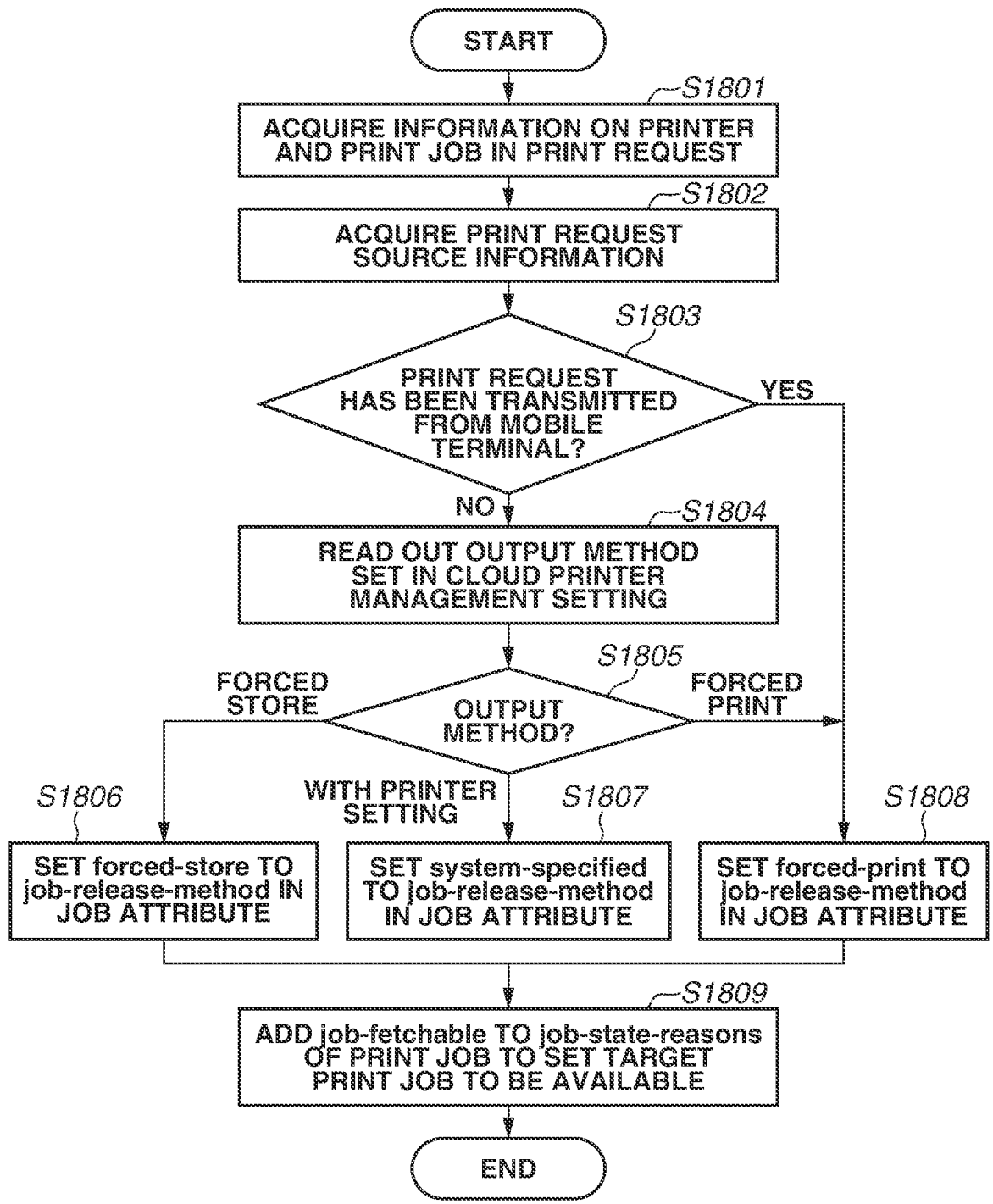
FIG. 18 is a flowchart illustrating processing that is performed by the cloud print server according to the second embodiment in response to receipt of a print request of a job.

FIG. 18 is a flowchart illustrating processing that is performed by the cloud print server according to the second embodiment in response to receipt of a print request of a print job.

In step S1801, the cloud print printing control unit 802 of the cloud print server acquires information on a printing apparatus and information on a print job (job IDs) which are contained in the print request.

In step S1802, the cloud print printing control unit 802 of the cloud print server acquires transmission source information on the print request.

In step S1803, the cloud print printing control unit 802 of the cloud print server changes the subsequent processing according to the transmission source information of the print request. In a case where the transmission source is a mobile terminal (YES in step S1803), the processing proceeds to step S1808. In step S1808, the cloud print job information management unit 806 of the cloud print server adds "job-release-method" to a job attribute of the target print job and sets "forced-print" as the value. In a case where the transmission source is not a mobile terminal (NO in step S1803), the processing proceeds to step S1804. In step S1804, the storage unit 805 of the cloud print server reads out the output method set for the target printing apparatus in the cloud printer management setting.

In step S1805, the cloud print printing control unit 802 of the cloud print server changes the subsequent processing according to the output method.

In a case where the output method is "forced store" (FORCED STORE in step S1805), the processing proceeds to step S1806. In step S1806, the cloud print printing control unit 802 of the cloud print server adds "job-release-method" to the job attribute of the target print job and sets "forced-store" as the value.

In a case where the output method is "with printer setting" (WITH PRINTER SETTING in step S1805), the processing proceeds to step S1807. In step S1807, the cloud print printing control unit 802 of the cloud print server adds "job-release-method" to the job attribute of the target print job and sets "system-specified" as the value.

In a case where the output method is "forced print" (FORCED PRINT in step S1805), the processing proceeds to step S1808. In step S1808, the cloud print printing control unit 802 of the cloud print server adds "job-release-method" to the job attribute of the target print job and sets "forced-print" as the value.

In step S1809, the cloud print job information management unit 806 of the cloud print server sets "job-fetchable" as the value of the job attribute "job-state-reasons" of the target print job, whereby the print job can be acquired by the printing apparatus 101.

Other Embodiments

The present invention can also be implemented by processing in which a program for implementing one or more functions of the above-described embodiments is supplied to a system or an apparatus via a network or a storage, and one or more processors in a computer of the system or the apparatus read and execute the program. Further, the present invention can also be realized by a circuit (for example, an ASIC) that realizes one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-127523, filed Aug. 10, 2022, which is hereby incorporated by reference herein in its entirety.

What is claimed is:
1. A printing apparatus configured to receive a first print job from an external apparatus and print the first print job, the printing apparatus comprising:
one or more processors; and at least one memory coupled to the one or more processors and having stored thereon instructions, which when executed by the one or more processors, cause the printing apparatus to:
  perform setting to enable a secure print setting with which the first print job received from the external apparatus is to be held without being printed, and the held first print job is printed in response to an instruction from a user to print the first print job;
  perform print control to receive a second print job from a print service via a network and print the second print job, wherein, in the print control, even in a case where the secure print setting is enabled, the second print job received from the print service is printed without holding the second print job in accordance with a job attribute of the received second print job; and
  receive a third print job from the print service, wherein, in a case where the print service determines whether a transmission source of a print request of the third print job stored in a virtual printer is a mobile terminal, wherein:
    if the transmission source is the mobile terminal, the print service specifies, as a value of the job attribute designating an output method of the third print job, a value indicating that printing is to be performed without holding the third print job in the printing apparatus, and provides the third print job to the printing apparatus; and
    if the transmission source is not the mobile terminal, the print service specifies, as the value of the job attribute designating the output method of the third print job, a value indicating that the third print job is to be held without being printed, and the held third print job is to be printed in response to an instruction from a user to print the third print job.

2. The printing apparatus according to claim 1,
wherein the second print job received from the print service contains a job attribute specifying an output method of the second print job, and
wherein, based on checking that a value of the job attribute is a value indicating that printing is to be performed without holding the second print job in the printing apparatus, the second print job is printed without holding the second print job.

3. The printing apparatus according to claim 2,
wherein the job attribute specifying the output method of the second print job is a job attribute that is able be specified by the print service, and
wherein the first print job transmitted from the external apparatus is different from the second print job transmitted from the print service and does not contain the job attribute and the value.

4. The printing apparatus according to claim 2, wherein as the value of the job attribute specifying the output method of the second print job, at least a value indicating that printing is to be performed without holding the second print job in the printing apparatus, and a value indicating that the printing is to be performed with the secure print setting of the printing apparatus are able to be specified.

5. The printing apparatus according to claim 2, wherein based on checking that the value of the job attribute is a value indicating that the second print job is to be held in the printing apparatus without executing printing, the second print job is to be held until a print instruction is received from a user.

6. A method for controlling a printing apparatus configured to receive a first print job from an external apparatus and print the first print job, the method comprising:
  performing setting to enable a secure print setting with which the first print job received from the external apparatus is to be held without being printed, and the held first print job is printed in response to an instruction from a user to print the first print job;
  performing print control to receive a second print job from a print service via a network and print the second print job, wherein, in the print control, even in a case where the secure print setting is enabled, the second print job received from the print service is printed without being held in accordance with a job attribute of the received second print job; and
  receiving a third print job from the print service, wherein the print service determines whether a transmission source of a print request of the third print job stored in a virtual printer is a mobile terminal, wherein:
    if the transmission source is the mobile terminal, the print service specifies, as a value of the job attribute designating an output method of the third print job, a value indicating that printing is to be performed without holding the third print job in the printing apparatus, and provides the third print job to the printing apparatus; and
    if the transmission source is not the mobile terminal, the print service specifies, as the value of the job attribute designating the output method of the third print job, a value indicating that the third print job is to be held without being printed, and the held third print job is to be printed in response to an instruction from a user to print the third print job.

7. The method according to claim 6,
wherein the second print job received from the print service contains a job attribute specifying an output method of the second print job, and
wherein, in the print control, based on checking that a value of the job attribute is a value indicating that printing is to be performed without holding the second print job in the printing apparatus, the second print job is printed without being held.

8. The method according to claim 7,
wherein the job attribute specifying the output method of the second print job is a job attribute that is able to be specified by the print service, and
wherein the first print job transmitted from the external apparatus is different from second print job transmitted from the print service and does not contain the job attribute and the value.

9. The method according to claim 7, wherein as the value of the job attribute specifying the output method of the second print job, at least a value indicating that printing is to be performed without holding the second print job in the printing apparatus, and a value indicating that the printing is to be performed with the secure print setting of the printing apparatus can be specified.

10. A non-transitory computer-readable storage medium storing executable instructions for executing a method for controlling a printing apparatus configured to receive a first print job from an external apparatus and print the first print job, the method comprising:
  performing setting to enable a secure print setting with which the first print job received from the external apparatus is to be held without being printed, and the held first print job is printed in response to an instruction from a user to print the first print job;

performing print control to receive a second print job from a print service via a network and print the second print job, wherein, in the print control, even in a case where the secure print setting is enabled, the second print job received from the print service is printed without being held in accordance with a job attribute of the received second print job; and receiving a third print job from the print service, wherein the print service determines whether a transmission source of a print request of the third print job stored in a virtual printer is a mobile terminal, wherein:
- if the transmission source is the mobile terminal, the print service specifies, as a value of the job attribute designating an output method of the third print job, a value indicating that printing is to be performed without holding the third print job in the printing apparatus, and provides the third print job to the printing apparatus; and
- if the transmission source is not the mobile terminal, the print service specifies, as the value of the job attribute designating the output method of the third print job, a value indicating that the third print job is to be held without being printed, and the held third print job is to be printed in response to an instruction from a user to print the third print job.

* * * * *